July 12, 1938.    C. A. CARLSON    2,123,400
MIRROR SHIELD
Filed Feb. 19, 1936
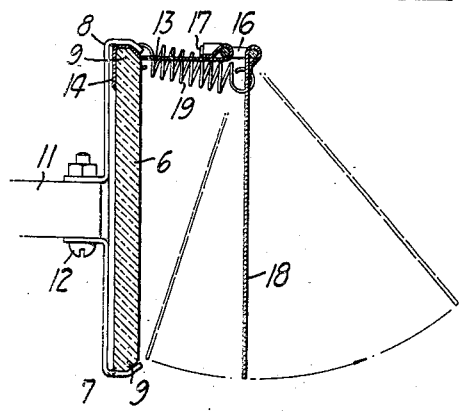
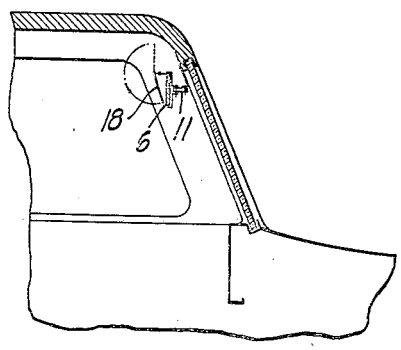
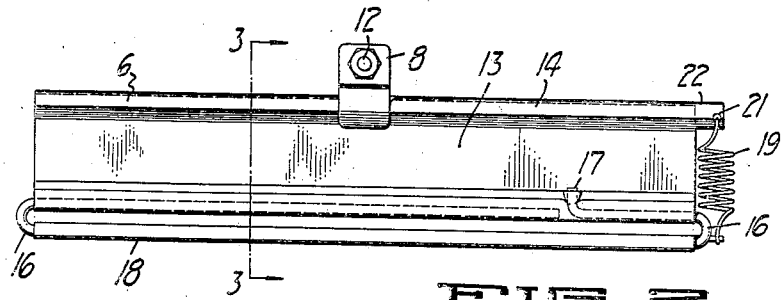
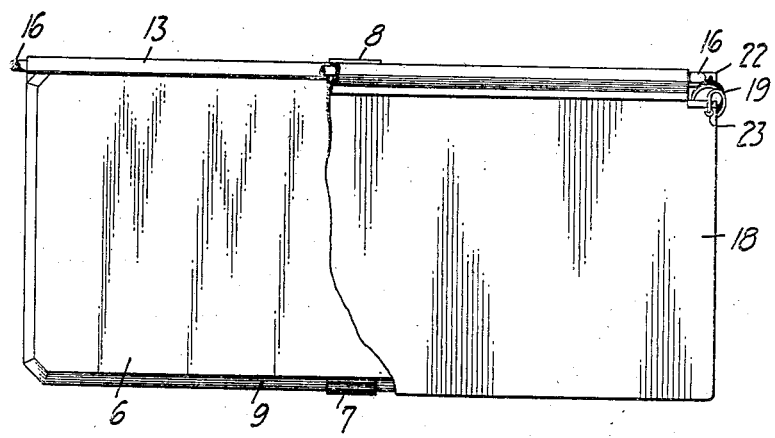
INVENTOR.
Carl A. Carlson
BY Marcus Lothrop
ATTORNEY.

Patented July 12, 1938

2,123,400

UNITED STATES PATENT OFFICE 2,123,400

MIRROR SHIELD

Carl A. Carlson, San Francisco, Calif.

Application February 19, 1936, Serial No. 64,735

2 Claims. (Cl. 88—77)

My invention relates to means specially adapted to be used with rear view mirrors on vehicles, such as automobiles, and is primarily adapted to be attached to standard mirrors at the present time in use.

An object of my invention is to provide means for shielding a vehicle rear-view mirror in order to prevent unwanted reflection therefrom.

Another object of my invention is to provide a mirror shield which readily can be attached to a standard mirror.

An additional object of my invention is to provide a mirror shield which can be utilized or not, at the option of the user.

A further object of my invention is to provide a mirror shield which can cheaply and readily be fabricated of standard materials.

The foregoing and other objects are attained in the embodiment of the invention illustrated in the drawing, in which—

Fig. 1 shows in cross-section the forward interior portion of an automobile having a standard rear vision mirror therein, with the mirror shield of my invention applied thereto.

Fig. 2 is a plan of a mirror shield according to my invention, shown as applied to a mirror.

Fig. 3 is a cross-section the plane of which is indicated by the line 3—3 of Fig. 2.

Fig. 4 is a front elevation of a mirror shield in accordance with my invention, mounted upon a mirror, a portion of the shield being broken away to disclose the mirror adjacent thereto.

In its preferred form, the mirror shield of my invention is intended to be utilized in conjunction with an automobile rear-vision mirror the margin of which is engaged by a clamp, and entails a mounting interposed between the mirror margin and the clamp to which a shield is hinged for movement between a position overlying the mirror and a position away from the mirror, together with a resiliently yielding means for maintaining the mirror in either selected one of the two positions.

It is customary in an automobile to mount a rear-vision mirror 6 between a pair of clamps 7 and 8 each of which engages the margin 9 of the mirror. The two clamps preferably are held together and are fastened to a mounting bracket 11 by a fastener 12. When the fastener is loosened, the clamps 7 and 8 can be separated and the mirror 6 can be removed therefrom. The mirror is usually located in such a position that, especially at night, light rays from the headlamps of an overtaking vehicle are reflected directly into the driver's eyes. To overcome this defect and to block out such reflected rays from the driver's eyes when desired, I preferably provide a mirror shield which can be utilized in conjunction with a mirror of the type mentioned.

In order that there will be no necessity for additional attaching means, I preferably provide a mounting plate 13 which is generally a planar sheet, one margin of which is curved to provide a hook 14 overlying the margin 9 of the mirror and is adapted to be interposed between such margin and the clamp 8. The mounting plate 13 is firmly held, therefore, between the mirror and the clamp 8. When the fastening 12 is tight, the plate 13 is not movable, either laterally or transversely, because of its tight engagement with the mirror.

The other edge of the mounting plate is preferably curled or folded to provide a fastening for a hinge wire 16 which is looped at opposite ends and terminates within the fold with an outstruck portion 17 to prevent slippage and rotation. Rotatably engaging the hinge wire 16 is a shield 18 preferably composed of a planar metal plate, at its upper end curved over the hinge wire and suitably fastened as by welding. The plate 18 is adapted to be moved from a lower position overlying the mirror and thereby blocking out reflected rays, to a second or upper position away from or not overlying the mirror, and for such purpose is freely rotatable about the hinge wire 16.

In order that the shield will be resiliently retained in either of the selected positions, I preferably mount a coil spring 19 with one end fastened through an aperture 21 in a projection 22 of the mounting plate and with the other end engaged through an aperture 23 in the shield 18. The location of the points of attachment of the spring with respect to the hinge rod 16 is such that the spring is effective as a live point resiliently to urge the shield into either of the mentioned positions.

With this arrangement the vehicle driver, by a simple and very light touch on the shield 18, can move it from its inactive position into its active position, and vice versa, thereby gaining full use from the mirror 6 but at the same time preventing any undesired rays from being reflected and without in any wise affecting the setting or adjustment of the mirror.

I claim:

1. A device for use with a mirror having a clamp engaging the margin of said mirror, comprising a mirror shield including a mounting member adapted to be interposed and gripped between said mirror and said clamp, a shield hinged to said mounting member and movable between a first position overlying said mirror and a second position away from said mirror, and a spring fastened to said member and to said shield at points which with said hinge are all in alignment in a position of said shield between said positions for urging said shield into either of said positions.

2. A device for use with a mirror having a margin and a clamp hooked over said margin, comprising a mirror shield including a mounting member adapted to be inserted and clamped between said clamp and said mirror, a shield hinged on said mounting member to move from a first position covering said mirror to a second position uncovering said mirror, and means including a spring having one end fastened to said mounting member and the other end fastened to said shield, the fastenings being at such points that the spring passes over the axis of said hinge as said shield moves from one to the other of said positions for yieldingly retaining said shield in either of said positions.

CARL A. CARLSON.